Figure 5:
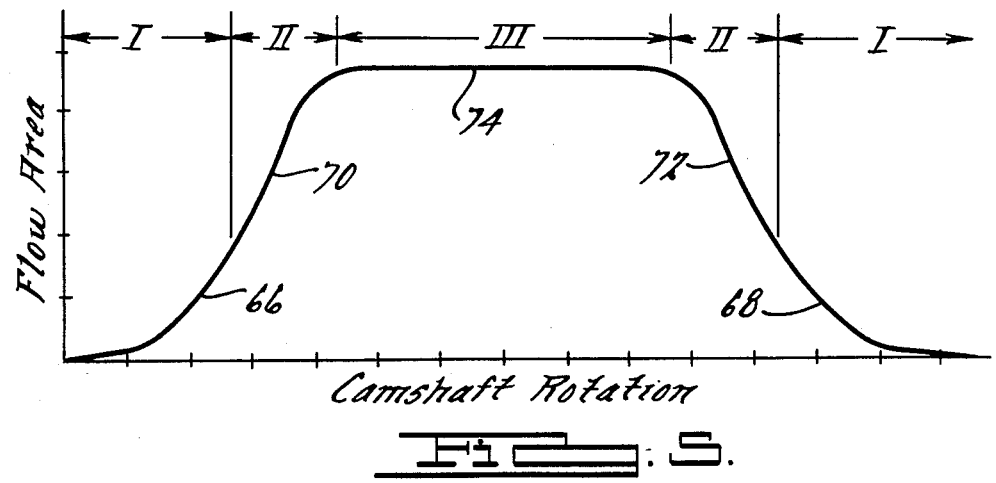

United States Patent [19]

Asmus

[11] Patent Number: 4,633,403
[45] Date of Patent: Dec. 30, 1986

[54] ENGINE VALVE TIMING

[75] Inventor: Thomas W. Asmus, Oak Park, Mich.

[73] Assignee: Chrysler Motors Corporation, Highland Park, Mich.

[21] Appl. No.: 596,979

[22] Filed: Apr. 5, 1984

[51] Int. Cl.⁴ .................................................. F01L 1/34
[52] U.S. Cl. ............................. 364/431.05; 123/90.16
[58] Field of Search ............. 364/426, 431.03, 431.05; 123/90.6, 90.11, 90.16

[56] References Cited

U.S. PATENT DOCUMENTS

| 2,997,991 | 8/1961 | Roan | 123/90.16 |
| 3,361,122 | 1/1968 | Wagner | 123/90.16 |
| 3,981,281 | 9/1976 | Deschler et al. | 123/90.6 |
| 4,054,109 | 10/1977 | Herrin et al. | 123/90.16 |
| 4,221,199 | 9/1980 | Buuck et al. | 123/90.16 |
| 4,261,307 | 4/1981 | Oldberg | 123/90.16 |
| 4,327,676 | 5/1982 | McIntire et al. | 123/90.6 |

Primary Examiner—Parshotam S. Lall
Attorney, Agent, or Firm—Kenneth H. MacLean, Jr.

[57] ABSTRACT

A method of optimizing valve timing events for a modern high speed internal combustion engine for the purpose of improving fuel economy during idle, high speed performance and allowing for a leaner fuel/air ratio during idle. The method is based on an analytical treatment of the instantaneous relationship between valve flow area and the changes in cylinder volume occurring because of piston motion.

3 Claims, 18 Drawing Figures

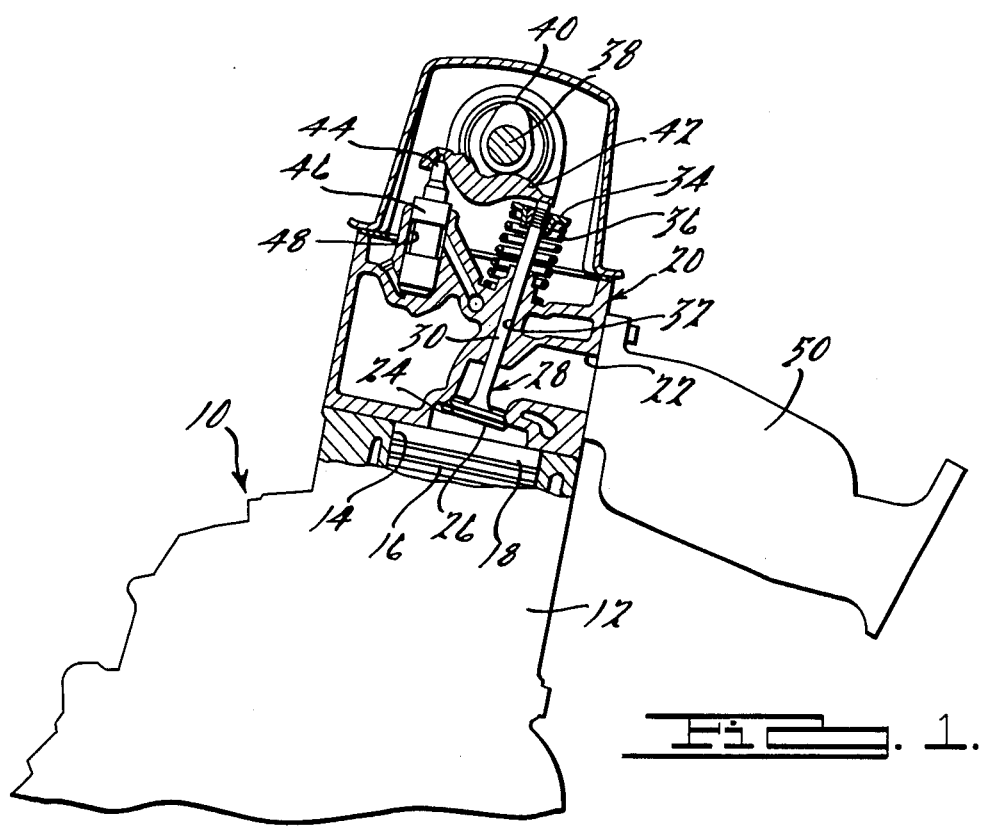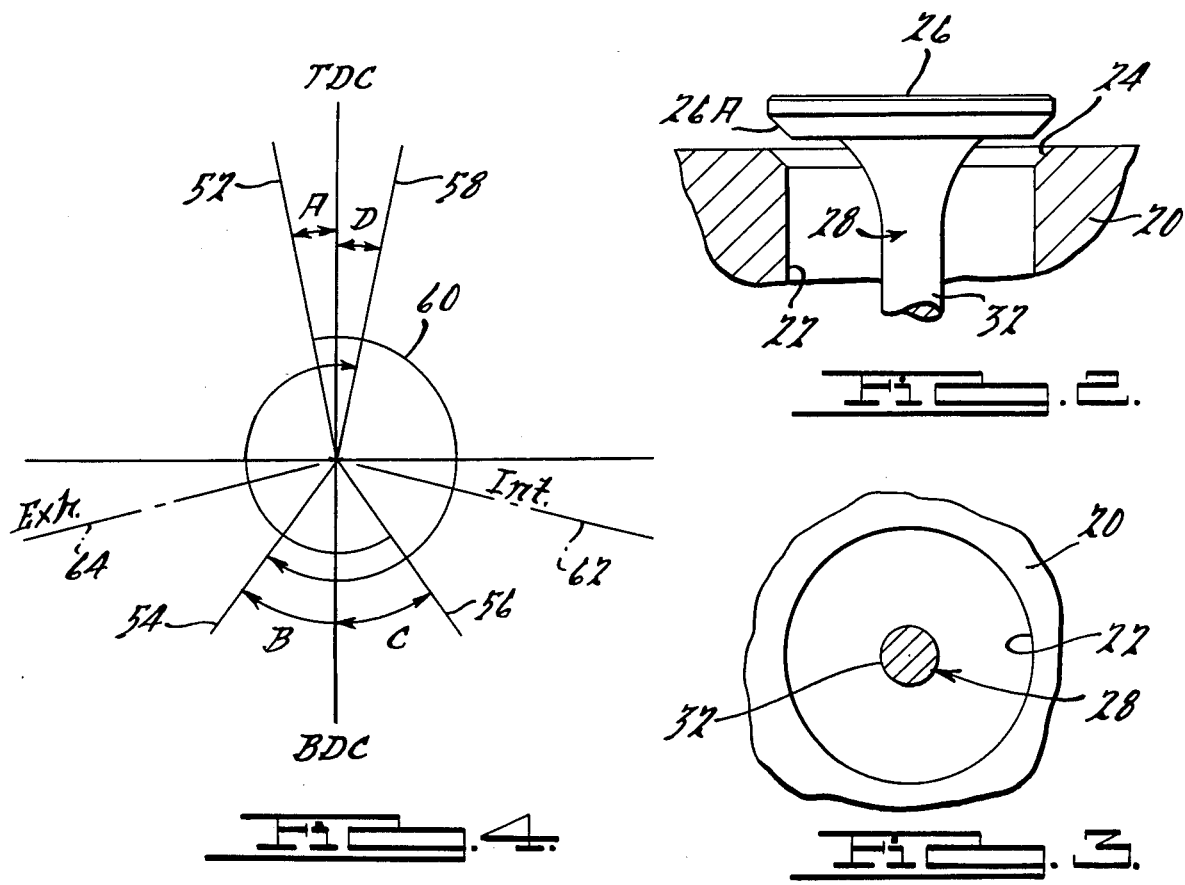

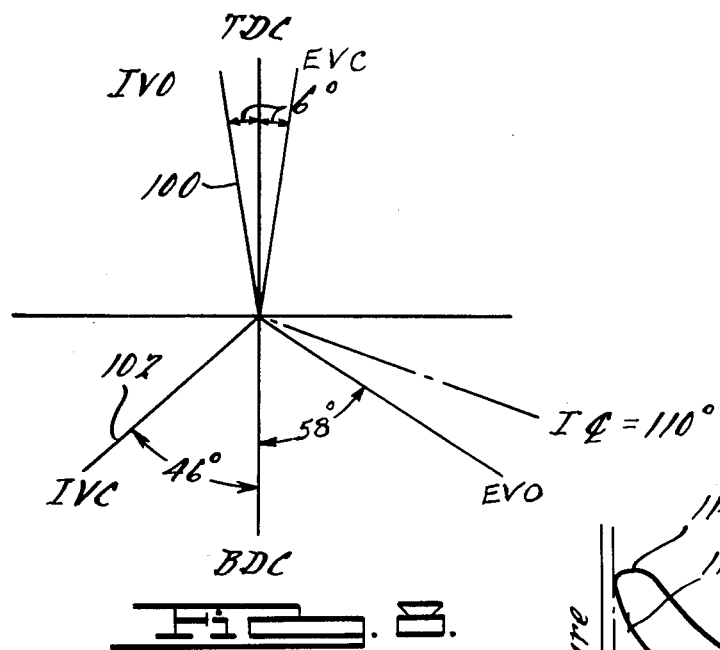
FIG. 8.
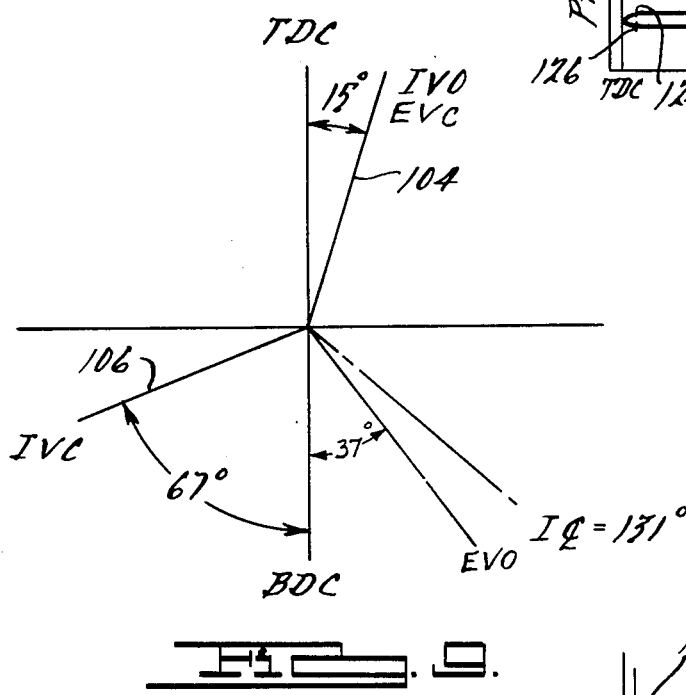
FIG. 9.
FIG. 8a.
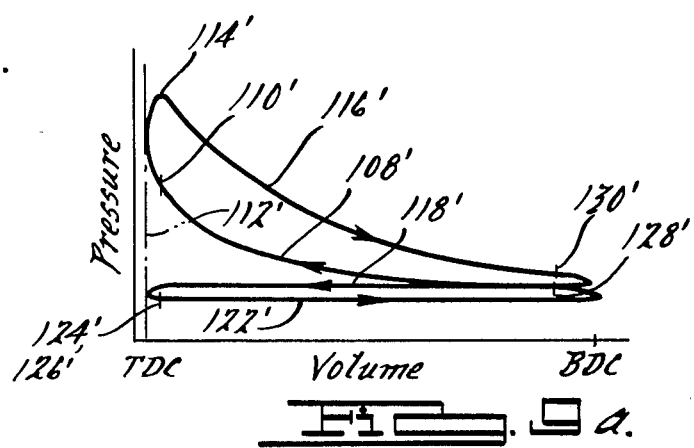
FIG. 9a.

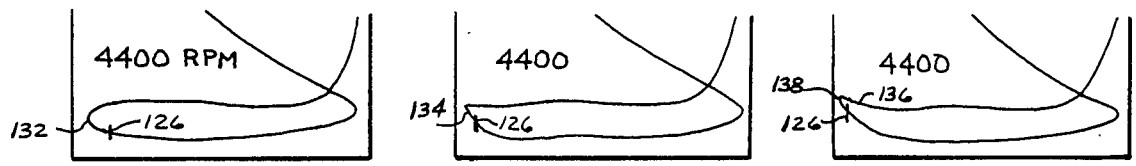
Fig. 10a.   Fig. 10b.   Fig. 10c.
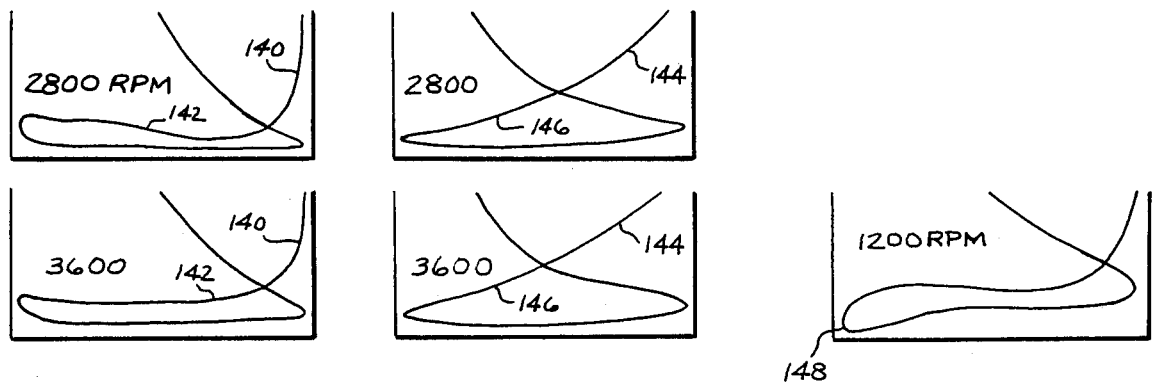
Fig. 11a.   Fig. 11b.   Fig. 12.
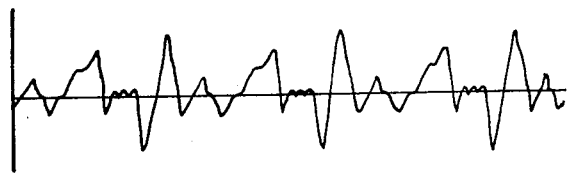
Fig. 13.

ENGINE VALVE TIMING

BACKGROUND

This application sets forth a method for optimizing valve timing events for a modern high speed, spark ignited internal combustion engine.

Modern internal combustion engines have typically provided good high speed performance characteristics by maximizing the engine's pumping capacity or "breathing". In other words, the engine has been made to perform well as a high speed pump. To achieve high speed pumping capacity, typical engine valving events are utilized such as: an early intake valve opening (in relation to top dead center or TDC) and a late exhaust valve closing (EVC). This results in a very large valve overlap during which both intake and exhaust valves are open simultaneously. It has long been standard practice that a large valve overlap is necessary for good engine power at high speeds.

Unfortunately, a large valve overlap also has the effect of greatly decreasing the engine ability to idle economically. In fact, to idle such an engine at a reasonably low speed, the standard practice is to to supply an overly rich fuel/air mixture to the engine and to use retarded ignition timing. This results in poor idle fuel economy.

The object of applying the subject method to engine valve events is to decrease valve overlap and hence improve engine idle fuel economy without substantially decreasing high speed performance. This is accomplished primarily by delaying the intake-valve opening (IVO) from traditional positions in relation to TDC. Resultantly, valve overlap is greatly decreased and idle performance and economy are enhanced.

Figure 6:
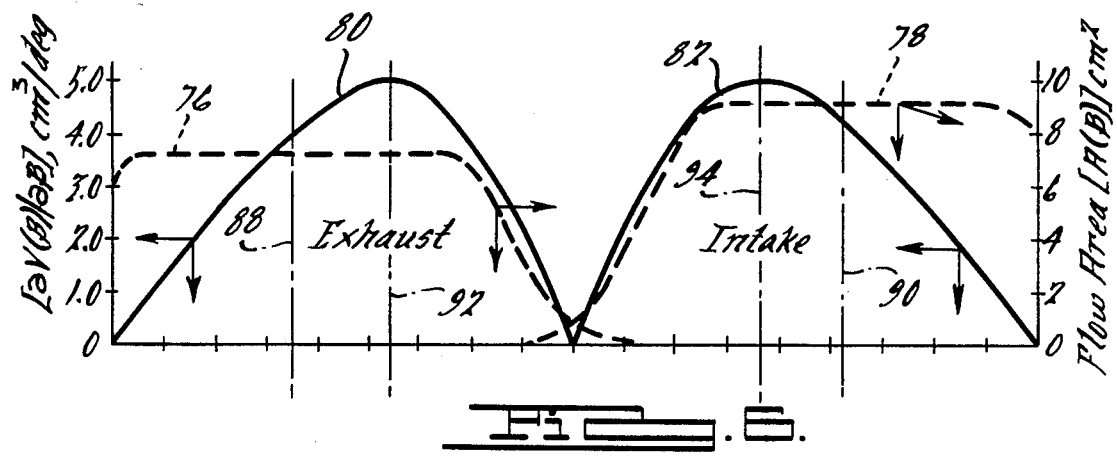
Figure 7:
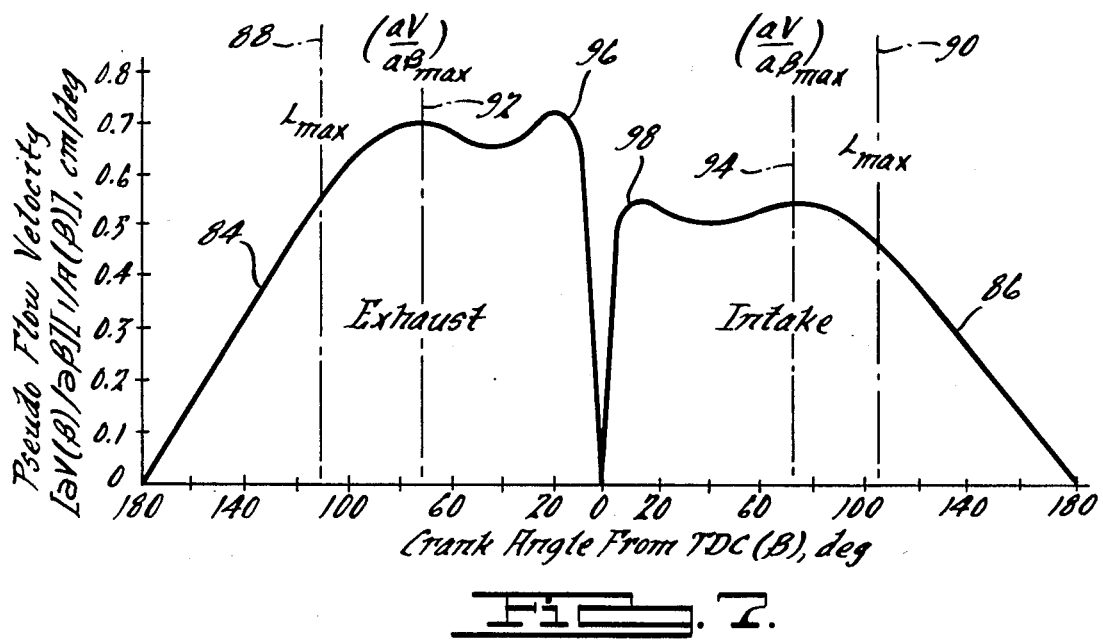

Other objects and advantageous features of this method will be more readily appreciated from the following detailed description and to the drawing figures, characterized as follows:

FIG. 1 is a partially sectioned view of a modern high speed, spark ignited internal combustion engine; and FIGS. 2 and 3 are fragmentary views of the engine poppet-type valve shown in FIG. 1; and FIG. 4 is a graphical representation of the valve timing events in relation to crankshaft rotation; and FIG. 5 is a graphical representation of the flow area available past the engine valve in relation to camshaft rotation; and FIG. 6 is a graphical representation of both the flow area available past an intake and an exhaust valve as well as the volumetric changes of the cylinder both in relation to rotation of the crankshaft and resultant movements of the piston;

FIG. 7 is a graphical representation of what may be characterized as the instantaneous flow condition at the valves in relation to crankshaft rotation; and FIGS. 8 and 9 are graphical representations of two examples of camshaft selections for intake valve opening and closing; and FIGS. 8a and 9a represent pressure-volume diagrams corresponding to the valve events characterized in FIGS. 8 and 9 respectively; and FIGS. 10a, b, c, show expanded open valve portions of the pressure-volume diagrams for three camshafts; and FIGS. 11a, b show expanded open valve portions of the pressure-volume diagrams for two camshafts; and FIG. 12 shows an expanded open valve portion of the pressure-volume diagram for a camshaft in which the intake value opening event has been delayed after TDC an undesirable amount; and FIG. 13 shows idle engine vibration tracings for two camshaft configurations.

GENERAL DISCUSSION OF ENGINE OPERATION, PARTICULARLY AS RELATED TO VALVE EVENTS

In FIG. 1, an engine 10 is illustrated including engine block 12 in which a number of cylinder bores 14 are formed (only one of which is shown). A piston 16 is mounted for axial reciprocation therein in response to the well known forces of combustion gases. The pistons 16 are connected by connecting rods to a crankshaft (neither of which are shown) in a known manner. Movement of the piston 16 within the cylinder 14 causes the crankshaft to rotate within the engine block 12. The cylinder 14 and piston 16 partially form a combustion chamber 18 which is completed by a valve supporting cylinder head 20.

Cylinder head 20 includes one intake and one exhaust passage leading into each combustion chamber 18. In FIG. 1, only the exhaust passage 22 is illustrated. The passage 22 opens to the combustion chamber 18 past an annular valve seat portion 24. The valve seat portion 24 is engaged by the enlarged head portion 26 of a poppet-type valve 28 which also includes an elongated valve stem portion 30. The valve stem portion 30 extends through a valve guide portion 32 of the cylinder head. The upper end of the valve stem 32 is operably connected to a spring retainer 34 which in turn captures one end of a compression type valve spring 36 the other end of which engages the cylinder head 20. The compression spring 36 and the valve guide 34 cooperate to normally bias the valve 28 in the illustrated upward position in FIG. 1 so that head portion 26 seats against portion 24 to block flow through the passage 22 from the combustion chamber 18. In the case of an intake passage, the valve controls the flow from the intake passage into the combustion chamber.

The valve 28 is adapted to be moved downward to communicate passage 22 with combustion chamber 18. A rotatable camshaft 38 is located above the upper surface of a cylinder head 20. Camshaft 38 includes a plurality of lobed portions 40 which engage a cam follower arm 42 one end of which engages the upper end of the portion 30 of valve 28. The other end of the cam follower arm 42 rests on a rounded pivotal portion 44 of a lash adjuster assembly 46. The lash adjuster assembly 46 is housed within a bore 48 in the upper portion of the cylinder head 20. As the lobed portion 40 is rotated so that its eccentric or radially outward portion progressively engages the cam follower 42, the valve stem 30 and resultantly the head portion 26 of the valve 28 are moved against the force of spring 36 to communicate the combustion chamber 18 and passage 22. In FIG. 1, when the valve 28 is opened in the aforesaid manner, exhaust gases from the combustion chamber 18 flow past the valve head portion 26 and into passage 22 and hence to an exhaust header 50 for eventual discharge to atmosphere.

FIG. 2 is an enlarged (inverted with respect to FIG. 1) sectioned view of the valve in a partially open position with the head portion 26 axially moved away from the seat portion 24. FIG. 3 is a sectioned view of the head portion of the valve shown in FIG. 2. The clearance between the seat portion 24 and the surface 26a should be noted which defines the flow area of fluid past the valve 28. In FIG. 5, the flow area past the valve is graphically represented in relation to camshaft rotation. Note that there are basically three regions or stages of fluid flow area past the valve each producing markedly different flow rates thereby. During The first stage (I) of valve lift, the minimum flow area corresponds to a frustum of a circular cone where the conical face between the valve and the valve seat defines the flow area. As valve lift proceeds into a second stage (II), the minimum area is no longer merely between the valve face and the seat but rather between the seat and the nearest edge of the valve and may be represented as the frustum of a right circular cone having ever increasing base angle, i.e., approaching a cylinder. In the third stage (III), of valve opening, the maximum flow area is defined by the throat minus the sectional area of the valve stem (it may be helpful to refer back to FIG. 3). It should be noted from the FIG. 5 that increasing the maximum travel of the valve head away from the valve seat only affects flow during stage 3. The lift would have a limited effect on flow since the flow is primarily determined by the throat diameter of the passage 22 of the cylinder head.

It is very helpful to graphically illustrate the timing of valve events and typically the representation shown in FIG. 4 is employed. FIG. 4 is a valve timing diagram of a typical automotive engine. The 12 o'clock position is labelled TDC for Top Dead Center which represents the uppermost position of the piston within the cylinder. The 6 o'clock position is labelled BDC for Bottom Dead Center which represents the lowermost position of the piston within the cylinder. A 360° pass around the diagram of FIG. 4 represents the open-valve portion of one engine cycle. The line 52 in the diagram represents the opening of the intake valve (IV) which typically occurs before TDC. Line 54 represents a closing of the intake valve (IVC) which occurs after the piston has once begun upward movement from the BDC position. Line 56 represents the opening of the exhaust valve (EVO) which normally occurs before the piston reaches its BDC position and line 58 represents the closing of the exhaust valve (EVC) which normally occurs after the piston moves downward from its TDC position.

Following the crankshaft rotation indicator 60 in FIG. 4, the intake valve first opens before the piston has reached TDC (an angular orientation A before). The piston passes TDC and moves downward in the cylinder drawing in a fresh charge of fuel and air until the piston passes its BDC position, and the intake valve closes. The piston then moves upward in the cylinder for the compression portion of the cycle. Closing of the intake valve occurs after angular movement B of the crankshaft past the BDC position. This late intake valve closing is beneficial at high speeds to volumetric efficiency since the cylinder pressure is still below that of the intake system at BDC. The piston continues to move upward in the cylinder compressing the fuel/air charge until the charge is ignited by the spark plug which produces the powerstroke of the engine. Resultantly, the piston is forced downward in the cylinder while the combustion chamber volume increases. Before the piston reaches its BDC position, the exhaust valve opens at an angular degree C before BDC. This is beneficial during high speed operation of the engine by permitting the gas pressure within the expanding cylinder to produce a blow-down of spent gases and therein to accelerate the column of out-flowing exhaust gases. The piston 16 moves through the BDC and pushes the spend gases from the combustion chamber. After the TDC position an angular degree D, the exhaust valve closes at 58. Resultantly, the pumping work associated with scavenging the products of combustion from the combustion chamber are reduced by early exhaust valve opening and late closing. These described valve timing features have traditionally been believed to increase performance at higher engine speeds. However, it is recognized that they incur torque penalties at low speeds and the idle qualities are compromised. Particularly, late intake valve closing allows some fresh fuel-air charge to escape back into the intake system at the beginning of the compression stroke and therefore reduces low speed volumetric efficiency. Likewise, early exhaust valve opening lowers the expansion ratio and thus lowers cycle efficiency.

Referring again to FIG. 4, it should be understood that related to lines 52 and 54 which represent the opening and closing respectively of the intake valve, a center line of intake valve action may be represented by line 62. Likewise, with lines 56 and 58 representing opening and closing of the exhaust valve respectively, the line 64 represents the center line of the exhaust valve action.

Of importance is valve overlap which occurs when piston moves in the vicinity of the TDC position. Valve overlap will be represented by summing the angular dimensions A and D. A or D may be to either side of the TDC line marks and thus the respective sums must be algebraically added.

In FIG. 5, a typical flow area plot around a poppet-type valve as used in automobile engines is illustrated. It should be noted that the curve illustrates three basic phases of flow past the valve. Phase 1 occurs soon after the valve begins to open and also just as the valve closes. In Phase I, the minimum flow area past the valve corresponds to a frustum of a right circular cone where the conical face between the valve and valve seat defines the flow area (reference is made to FIG. 2 and numerals 24 and 26A) As the valve opens more fully to Phase II, the minimum flow area is no longer just between the valve face and the seat but rather between the cylinder head and the nearest edge of the valve which may be represented as the frustum of a right circular cone having an ever increasing base angle, i.e., approaching a cylinder. Phase II flow occurs also as the valve begins to close after maximum lift mid-way between opening and closing. The Phase III of valve flow represents the position of the valve in a fully open or maximum lift position. In this phase of flow, the flow area is basically defined as the throat area of the valve minus the sectional area of the valve stem. It should be noted that this maximum flow area in Phase III is primarily dependent on diameter of the valve and is relatively independent on the valve lift.

It should be apparent from FIG. 5 that relatively little flow actually takes place in Phase I as repesented by numerals 66,68. Substantially greater flow occurs during the Phase II portion of the valve action represented by numerals 70,72. Maximum flow conditions occur during the Phase III portion of the valve action opening represented by numeral 74. Flow during the Phase III portion is dependent on a valve diameter which in turn is related to the diameter of the passage 22 in FIG. 2. It has been found that by increasing valve lift beyond a point where maximum lift divided by the valve diameter is greater than about 0.3 is unlikely to yield significantly increased flow area and incremental volumetric efficiency.

Engine breathing or pumping operation is, of course, dependent on the above described valve operation and is also dependent on movements of the engine parts such as the pistons. The instantaneous piston velocity is dependent upon several factors as follows: engine speed (N), engine stroke ($2_r$), the connecting rod length (R), and the angular crankshaft displacement ($\beta$) from TDC.

The instantaneous linear piston displacement is determined by the following equation:

$$l(\beta) = R + r - r \cdot \cos \beta - \sqrt{R^2 - r^2 \cdot \sin^2 \beta} \quad (1)$$

Differentiation of Eq. (1) with respect to crankshaft angular displacement gives a pseudo velocity $$\frac{\partial l(\beta)}{\partial \beta} = \left[ r \cdot \sin \beta + \frac{r^2 \cdot \sin \beta \cos \beta}{\sqrt{R^2 - r^2 \cdot \sin^2 \beta}} \right] \frac{\pi}{180} \quad (2)$$

which, when multiplied by engine speed, gives the real instantaneous piston velocity (v)

$$v = \left[ \frac{\partial l(\beta)}{\partial \beta} \right] \frac{360}{\text{rev}} \cdot N \quad (3)$$

The pseudo instantaneous rate of change of volume due to piston motion is $$\frac{\partial V(\beta)}{\partial \beta} = \frac{\pi b^2}{4} \cdot \left[ \frac{\partial l(\beta)}{\partial \beta} \right] \quad (4)$$

where b = bore

The pseudo instantaneous rate of acceleration is given as:

$$\left[ \frac{\partial^2 l(\beta)}{\partial \beta^2} \right] = \left[ r \cdot \cos \beta + \sqrt{R^2 - r^2 - \sin^2 \beta} - \sin^2 \beta + \frac{r^2 \cdot \sin^2 \beta \cos^2 \beta}{R^2 - r^2 \cdot \sin^2 \beta} \right] \left[ \frac{\pi}{180} \right] \quad (5)$$

A plot of Eqn. (4), the pseudo instantaneous rate of change in volume for a typical, modern high speed engine is shown in FIG. 6. Also shown is the flow area, A($\beta$) in cm² by broken line. Note that maximum piston velocity occurs at a crank position of less than 90° from TDC.

As a means of conceptualizing the instantaneous flow conditions at the valves, the rate of change of cylinder volume may be divided by the instantaneous valve flow area to yield pseudo flow velocities across the valves. This pseudo flow velocity may be expressed as $$\left[ \frac{\partial v(\beta)}{\partial \beta} \cdot \frac{1}{A} \right] = \frac{\pi b^2}{4A} \left[ \frac{\partial l(\beta)}{\partial \beta} \right] \quad (6)$$

In FIG. 6 of the drawings, the rate of change of cylinder volume and valve flow area over the open valve portion of the engine cycle is shown in relation to the crank angle from TDC. It should be noted that both FIGS. 6 and 7 are vertically related and aligned so that crankshaft angles on either side of TDC as represented on the horizontal axis, are in vertical alignment. Specifically, in FIG. 6, the broken lines 76,78 represent the flow areas past the exhaust and the intake valve respectively in relation to crankshaft rotation. These data are based on a 2.2 liter Chrysler 4-cylinder engine with a camshaft having the following characteristics: 244 crankshaft degrees intake duration; 244 crankshaft degrees exhaust duration; 28 crankshaft degrees valve overlap; 106 degrees after TDC intake centerline; 1.09 centimeters maximum lift on the intake and 1.09 maximum lift on the exhaust. The engine itself has a bore of 8.75 centimeters; a stroke equal to 9.2 centimeters; a connecting rod length of 15.1 centimeters; a swept volume per cylinder of 553.2 cubic centimeters; and a clearance volume equal to 72.8 cubic centimeters.

In addition to showing the valve flow areas in FIG. 6, plots labeled 80 and 82 show the volumetric changes in the cylinder volume of the 2.2 liter engine as produced by piston movement. By dividing the rate of change of cylinder volume (lines 80 and 82) by the valve flow areas (lines 76 and 78) at any particular crankshaft angle with respect to TDC the graphical plot shown in FIG. 7 is generated. The labels or numerals 84 and 86 for the respective plots in FIG. 7 are for the exhaust and intake processes. FIG. 7 represents the instantaneous flow velocity relationship for flow of fluid in the particular engine and camshaft described heretofore. It should be noted that the broken line 88 represents the mid-point or centerline of the exhaust valve lift or opening. Likewise, the broken line 90 represents the mid-point of the intake valve action. The broken line 94 represents maximum piston velocity during the exhaust portion of the cycle and line 92 represents the maximum piston velocity during the intake valve portion of the cycle (see FIG. 6).

During the exhaust portion of the cycle, the mid-point 88 of the exhaust valve event occurs substantially prior to the maximum piston velocity during the exhaust portion of the cycle. In contrast, the mid-point 90 of the intake valve event occurs substantially after the maximum piston velocity and during the intake portion of the engine cycle. Maximum piston velocity and valve lift do not and cannot coincide because of many geometric constraints within valve trains and piston assemblies of practical automotive engines. From the graphics shown in FIG. 7, it can be readily understood that during the exhaust portion of the engine cycle, the fluid flow from the combustion chamber is basically inhibited by the attainment of maximum piston velocity represented by the 92 after the mid-point position of valve lift represented by line 88. Obviously, the valve is nearer the closing portion of the cycle before maximum piston velocity is achieved. The peak or bulge labelled 96 showing to the left of the TDC position during the exhaust cycle reflects the fact that the exhaust valve is accelerating toward closure while the piston velocity is somewhat linear at this point. The peak 96 reflects an irrevocable trapping of exhaust gases in the combustion chamber.

Similarly, a peak 98 during the intake portion of the cycle is indicative of the accelerating rate of opening of the intake valve in relation to the more nearly linear motion of the piston at this portion of the intake cycle. The peak 98 is indicative of intake valve throttling early in the intake portion of the cycle. However, this intake throttling is relatively inconsequential provided sufficient time and flow capacity are available prior to the closing of the intake valve. It is known that a significant detriment to high volumetric efficiency is the mass of trapped fluid at the closing of the intake valve. Any instantaneous flow losses which may occur early in the intake cycle is of lesser importance. It should be noted that the maximum piston velocity as represented by line 94 during the intake cycle, occurs substantially before the mid-point maximum lift, and thus the fluid flow into the cylinder is not substantially inhibited by the actions opening and closing of the valve in relation to movements of the piston. In other words, the characteristics of the valve opening prior to attaining maximum velocity is of little consequence in the fluid charging process of the cylinder.

From the data shown in FIG. 7, it is clear that the relative position with respect to TDC of exhaust valve closing is important to avoid excessive trapping of exhaust gases in the cylinder. Significantly more pronounced peaks than the one illustrated by the portion 96 have been demonstrated by closing the exhaust valve sooner than the aforedescribed camshaft. By closing the exhaust valve sooner, the centerline of the exhaust action produced by the cam moves closer BDC (reference is hereby made to FIG. 4). A result of early exhaust valve closing is a reduced volumetric efficiency as trapped exhaust gases displace the incoming fresh charge of fuel and air. Added heat content to the fresh charge by the trapped exhaust gas is also a factor which may contribute to requirements for higher octane fuel. Likewise, it is evident from the data presented in FIG. 7 that the intake valve throttling early in the intake portion of the cycle is inconsequential since there is sufficient time and flow capacity available prior to the closing to provide sufficient charging of the cylinder. It is emphasized that the most significant determinant of volumetric efficiency is a mass of trapped charge at intake valve closing.

ENGINE VALVE TIMING SPECIFICS

The opening of the intake valve should be conceived as not only of the beginning of the cylinders fluid intake process but also it is the beginning of the valve overlap period in which both the exhaust valve and intake valve are open. When intake valve opening occurs substantially before TDC in a naturally aspirated engine, exhaust gases from the combustion chamber are pushed into the inlet system driven by a pressure gridient therebetween. The exhaust diluted fresh charge begins to flow into the cylinder only after the cylinder pressure is reduced to a level below that of the intake manifold by virtue of movement of the piston downward in the cylinder. The point at which fresh charge begins to enter the cylinder depends upon: timing of the exhaust valve closing, the pressures in the intake and exhaust manifold; and the compression ratio of the engine. Typical conditions conducive to extensive exhaust backflow into the intake are: low engine speeds; low intake manifold pressures; early intake valve opening; late exhaust valve closing; low compression ratios. The engine operating condition generally associated with the undesirable consequence of extensive exhaust backflow is idle.

Delaying the opening of the intake valve tends to isolate the intake manifold from the cylinder until the pressures therebetween are more nearly equal. Significant delays in intake valve opening may actually cause the cylinder pressure to dip below the intake manifold pressure momentarily. This may not be detrimental to volumetric efficiency as adequate time later in the intake stroke exists for recovery of flow losses. You will recall that this is because the mid-point of intake valve lift occurs after the maximum piston velocity is attained. Intake valve opening has traditionally been provided in the range of 10 to 25 degrees before TDC. Applicant has discovered that engine performance is relatively insensitive to the timing point of the intake valve opening. It may under certain conditions be delayed significantly without incurring any real performance penalty. A desirable result of delaying the intake valve opening is a reduction in exhaust backflow into the inlet manifold as previously discussed.

The timing of the intake valve closing is selected after the piston reaches its BDC position. This provides sufficient time for cylinder filling under conditions when the cylinder pressure is still below the intake manifold pressure even after the piston has moved past the BDC position, particularly at higher engine speeds. Delaying the intake valve closing causes the volumetric efficiency to increase at high engine speeds but penalizes the engine somewhat at lower speeds. At these lower speeds, the intake manifold and cylinder pressures are nearly equal at BDC and some fresh charge may be pushed back into the intake manifold prior to closing of the intake valve. This results in a fractional loss in volumetric efficiency.

The selection for closing of the exhaust valve has been previously discussed. This timing point must be seen not only as the end of the exhaust stroke but also as the end of the valve overlap period in instances where valve overlap is present. Traditionally, the exhaust valve closing has been selected to fall in the range of 8 to 20 degrees after TDC. Its point of closing may significantly alter the fractional portion of burned gases (BGF) in the combustion chamber both at idle and at wide open throttle. At idle a quantity of exhaust gases may flow back in the combustion chamber through the exhaust valve under influence of high intake manifold vacuum. At high power levels it determines how much exhaust is allowed to escape. Late closing of the exhaust valve favors power at the expense of low speed torque and desirable idle conditions of the engine. It has been found that the rate at which closing of the exhaust valve influences low speed volumetric efficiency is about ½ the influence of the rate at which intake valve closing affects low speed volumetric efficiency. The closing of the exhaust valve should be selected so that at the power peak, the cylinder pressure is minimally above the exhaust back pressure at TDC during the open valve portion of the cycle.

The selection of the exhaust valve opening is a timing point fixed well before the end of the expansion stroke such that a pressure induced blow-down of the combustion products assists in scavenging exhaust gases. The major performance criteria for selecting the timing of exhaust valve opening is to insure that the cylinder pressure has been reduced to near the exhaust manifold pressure after BDC following the expansion stroke over the entire range of engine speeds. Engine pumping losses are minimized and scavenging efficiency maximized if the combustion chamber pressure during the exhaust stroke does not rise appreciably above the exhaust manifold pressure. It has been found that within traditional ranges of exhaust valve opening, this timing point is less critical in terms of high speed power loss than either altering the closing of the intake valve or of the exhaust valve. Therefore, the timing selection of the exhaust valve opening should be sufficiently early to satisfy high speed performance criteria, though no earlier than what can be justified on this basis as the effective expansion ratio is thus comprised.

Factors such as valve timing, valve lift and valve sizes combine to yield what is termed valve event. These valve event parameters are interrelated making it difficult to establish a priori an optimum set of design criteria for a given engine.

The flow area defined by valve opening may also be limited by a minimum flow area in either the valve throat or in an upstream section of the manifold. Excess valve lift may yield only small incremental flows although large lifts do insure that the maximum affective flow area is available longer, i.e., over a broader range of piston travel. It is never desirable to provide more valve lift than what can be justified on the basis of engine performance. To do so invariably raises valve gear acceleration rates and surface stresses and imposes the need for high-load valve springs to prevent valve floating. This may yield unnecessarily high valve gear friction.

Maximum valve sizes are naturally constricted by cylinder head dimensional considerations. Engines are usually designed with maximum combined valve sizes. Stroke/bore ratio is one of the principal factors determining the total valve area in relation to swept volume. Although there is no universally accepted intake valve to exhaust valve size ratio, the range in modern high speed, 4 cylinder engines is approximately 1.1 to 1.3. It is interesting to bear in mind that the volume of exhaust which must flow out of the cylinder through exhaust valve is approximately 2.75 times the volume of fresh fuel/air charge that must flow into the cylinder by way of the intake valve. Some insight can be gained as to the desirability of a given valve size ratio by analysis of Pressure-Volume (P-V) diagrams of an engine (to be discussed hereafter).

METHOD OF ESTABLISHING DESIRED VALVE EVENTS BY ANALYSIS OF P-V ENGINE CHARACTERISTICS

It is recognized that the previously identified valve events effect engine performance and is particularly evident at idle and at wide open throttle. The degree of valve overlap about TDC particularly affects combustion quality at idle. Other aspects of valve events influence volumetric efficiency at wide open throttle and therefore are prime determinants of engine performance. In the intermediate or part throttle range, the valve overlap affects combustion to a lesser degree than at idle. It is fundamental knowledge that combustion at idle is close to marginal because of excessive exhaust dilution, i.e., the fraction of burned gases (BGF) in the combustion chamber. Valve overlap increases BGF and is detrimental to combustion at idle. However, at many part throttle conditions the inherent fraction of burned gases is low enough that additional quantities of exhaust can be added to the combustion chamber to control formation of nitrogen oxides. At part throttle operation, it makes little difference whether this additional exhaust is recycled via valve overlap or externally via an exhaust gas recirculation system. Valve overlap tends to provide its maximum dosage of exhaust gas recirculation when it can be least tolerated (at idle) and valve overlap provides only relatively small dosages of exhaust gas recirculation when the engine can best utilize it (at part throttle). Therefore, the overlap is not looked upon as a really good means of controlling the formation of nitrogen oxides at part throttle. External systems perform this function much better. Optimization of valve events must be seen as a concern involving minimization of valve overlap for good idle quality while maximizing wide open throttle performance.

At idle, combustion is inherently slow partly owing to relatively great exhaust dilution of the intake charge, lower pressures and a quiescent fluid mechanical state directly resulting from the lower engine speed. Intake throttling normally reduces the intake manifold pressure to about ⅓ that of the exhaust manifold. The result is that retained exhaust in the combustion chamber must be expanded by a factor equal to this pressure ratio prior to a net induction of fresh charge from the intake system. The presence of any valve overlap provides a leakage pathway by which additional quantities of exhaust can backflow from the exhaust manifold through the combustion chamber and into the intake manifold. This undesirable source of residual exhaust gas in a combustion chamber can be regulated by reducing the amount of valve overlap. Since dilution by exhaust can least be tolerated at idle, minimization of overlap is beneficial. Improvements in the idle condition will result in any of the following:

reduced incidents of mis-fire or slow burn cycles;
tolerance for leaner or less rich fuel/air mixtures;
tolerance of lower idle speeds;
tolerance for optimum spark advance at idle.

Improvements in engine idle quality can be realized and more fuel efficient idle control strategies may be employed when a greater margin of combustion stability is created by reducing valve overlap. Reduced valve overlap, both increases intake vacuum and reduces hydrocarbon emissions. A leaner idle fuel-air mixture can also be used without adversely affecting idle quality.

In FIG. 8, a cam diagram for a conventional camshaft of a modern, high-speed Chrysler 2.2 liter engine is illustrated. FIG. 8 shows by line 100 that the intake valve opens 6° before TDC and by line 102 that the intake valve closes 46° after BDC. This produces a centerline of intake valve action of 110° after TDC.

In FIG. 9, a cam diagram in accord with the improved valve events method of this application is illustrated. The intake valve opens 15° after TDC as shown by line 104. This delayed opening may be referenced or labelled as minus 15° on a diagram since conventional illustrations usually show that line for intake valve opening to the left of or before TDC. Line 106 illustrates the closing position of the intake valve which occurs 67° after BDC. This produces a centerline of intake valving action of 131° after TDC. Corresponding FIGS. 8a and 9a illustrate pressure-volume diagrams respectively for the same 2.2 liter Chrysler engine incorporating camshafts characterized in FIGS. 8 and 9. In FIG. 8a, the upwardly sloping line 108 represents the portion of the engine cycle representing compression of an air/fuel charge in a cylinder. At a location shown by numeral 110, the sparkplug is energized which is slightly before the piston reaches the TDC represented by broken line 112. The line portion 114 from point 110 represents combustion of the fuel/air charge adjacent the TDC position which is followed by the downwardly sloping line 116 representing expansion of the products of combustion as the piston moves downward in the cylinder. The substantially constant pressure line 118 connected by portion 120 to expansion line 116 represents the exhaust or scavenging of combustion products past the exhaust valve. Line 122 represents the substantially constant pressure intake portion of the cycle. Note that the intake valve opens at numeral 124 and the exhaust valve closes at numeral 126 as in the diagram of FIG. 8. In addition, the intake valve closing is labeled by numeral 128 and the exhaust valve opening by numeral 130.

In FIG. 9a, the pressure and volume diagram of the 2.2 liter engine with a camshaft identified in FIG. 9 is illustrated. The significant lines and points of interest found in FIG. 8a are labelled similarly in FIG. 8b with the exception of a superscript added to the numerals. It should be obvious from the comparison of FIGS. 8a and 9a that there are slight diferences between the two diagrams. The decreased valve overlap (now zero) produced by delaying the intake valve opening produces a higher or faster pressure rise following ignition as indicated by a comparison of the areas in the vicinity of numerals 110, 114 and '114'. This is indicative of a faster combustion promoted by decreased exhaust gas leakage into the intake manifold and/or cylinder while the piston is in the vicinity of the TDC. The main differences between the cam configurations of FIG. 8 and the improved cam configuration in FIG. 9 as shown in FIGS. 8a and 9a are in more efficient combustion. The more efficient combustion is most notable at engine idle.

According to applicant's discoveries heretofore, a framework of understanding engine breathing processes as they are affected by the valve events has been developed. Hereinafter, a technique using graphical data will be described wherein undesirable and mostly inadvertent throttling caused by engine valve events is minimized for the purpose of increasing engine performance and simultaneously improving idle economy and condition. The key to this technique is the understanding of the open valve portion of engine pressure-volume (P-V) diagrams. Specifically, attention is focused on an expanded portion of the engine cycle (lower portion of FIGS. 8a and 8b) which represents the open valve cycle portion. The open valve portion of the pressure volume diagrams includes the portions 118 and 122 shown in FIGS. 8a and 9a and the lower parts of 108 and 116. The applicant generates these expanded P-V diagrams by use of an appropriate pressure transducer in the combustion chamber and a crankshaft encoder on the engine in such a manner that a precise record of the phase relationship between pressure and volume may be attained.

Regarding the timing of the exhaust valve closing, it has been found by examination of many diagrams for different valve events and particularly at relatively high engine speeds that the engine's performance is greatly affected by the timing of exhaust valve closing. High cylinder pressures remaining in the cylinder at the point of exhaust valve closing are detrimental to performance because they lead to increased trapped exhaust gases in the cylinder, which gases displace portions of the fresh charge and also increase the heat content of the fresh charge to the detriment of volumetric efficiency. The added heat content of the fresh charge also increases octane requirements. A zero or low overlap camshaft with early exhaust valve closing produces more noticeable pressure rises near the exhaust valve closing point than a high overlap cam. This reflects a more abrupt transition from exhaust to intake flow passages. By examining expanded pumping loop portions of the pressure-volume diagrams a basis for monitoring the status of the exhaust valve closing event is attained.

In FIGS. 10a, 10b and 10c, the open-loop portions of pressure-volume diagrams for three different camshafts are illustrated. Camshaft "a" is a conventional high overlap (28°) cam while camshafts "b" and "c" are minimum overlap (0°) cams. Cams "b" and "c" differ in the phasing of the exhaust valve closing and the corresponding intake valve opening to produce zero overlap. The following table shows the specific cam characteristics:

| Cam-shaft | Intake Duration | Exhaust Duration | Over-lap | Intake Opening | Exhaust Opening |
|---|---|---|---|---|---|
| a | 244° | 244° | 28° | 16° BTDC | 12° ATDC |
| b | 232° | 232° | 0° | 5° ATDC | 5° ATDC |
| c | 232° | 232° | 0° | 1° ATDC | 1° ATDC |

Referring to FIGS. 10a, b, c, note that the earlier timing of the exhaust valve closing (EVC) in "b" and "c" as compared to "a" mainly affects cylinder pressure near the end of the exhaust stroke as indicated by numerals 132, 134 and 138. The effect of this progressively earlier EVC increases as engine speed increases as can be seen in FIGS. 10a, 10b and 10c at 4400 RPM and 5600 RPM crankshaft speed respectively. High cylinder pressures recorded adjacent the EVC are indicated by the apex 138, particularly in FIG. 10c. This high pressure apex is detrimental to engine performance since it results in increased trapped exhaust in the combustion chamber. Resultantly, a portion of the fresh charge is displaced by products of combustion and the heat content of the fresh charge may necessitate an increased octane content. From FIGS. 10a, 10b and 10c, it can be determined that the cam "c" has an EVC event too early for performance while cam "a" is unnecessarily too late. Cam "b" may be slightly early but is certainly superior to cam "c" with its high rise apex 138.

Regarding the timing of the exhaust valve opening (EVO), it has been found that this point should be determined solely on the basis of wide open throttle (WOT) performance data. The exhaust valve should be opened just early enough to insure that blowdown of the products of combustion can be completed as soon as possible after BDC. Pumping loop pressure-volume diagrams provide a basis for precisely monitoring the timing of the EVO. By delaying EVO too long in the expansion cycle, the pumping work to scavege the cylinder is greatly increased and the engine performance and efficiency is reduced. It has been found that an EVO between 56° and 47° before BDC produce no significant differences on blow-down efficiencies. However, a delayed EVO of 37° BDC is definitely too late and results in increased pumping losses. This infers that the optimum exhaust valve opening point at least for the 2.2 liter Chrysler engine is earlier than 37° BBDC but may be slightly later than 47° BBDC.

In FIGS. 11a and 11b, the expanded open valve portion of the pressure-volume diagram for two different camshaft "a" and "b" are illustrated. Cam "a" is a conventional high overlap cam with an early EVO. Cam "b" is a low overlap cam with a late EVO. The camshaft characteristics are as follows:

| Cam-shaft | Intake Duration | Exhaust Duration | Overlap | Intake Opening | Exhaust Opening |
|---|---|---|---|---|---|
| a | 244° | 244° | 28° | 16° BTDC | 52° BBDC |
| b | 232° | 232° | 0° | 15° ATDC | 37° BBDC |

The effects of late EVO are readily apparent from a comparison of FIGS. 11a and 11b. In FIG. 11a, the earlier EVO produces efficient blow-down of exhaust gases at 2800 RPM and 3600 RPM. Efficient blow-down is evidenced by the steep portion 140 and rapid decrease of pressure during the exhaust portion of the cycle at 142. The inefficient blow-down shown in FIG. 11b contrasts with that in FIG. 11A and shows a gradual sloop 144 and higher exhaust pressures 146 over much of the exhaust cycle.

It is thus seen that by focusing attention to an expanded open valve pumping portion of a series of pressure-volume diagrams, a valuable analytical method for identifying engine flow losses and performance is provided. By this method losses associated with valve event timing may be identified. In summary, it is noted that the appearance of the apex 138 in FIG. 10c indicates an undesirably early exhaust valve closing. When an apex is found, the exhaust valve closing should be delayed just enough to eliminate the formation of this type of apex to avoid unnecessary power penalties under performance conditions. Furthermore, the timing of exhaust valve opening should be early enough to promote efficient blowdown near and somewhat after BDC at all engine speeds as can be determined from the portion of the expanded P.V. diagram and, specifically, portions 142, 146 in FIGS. 11a and 11b. This portion is the latter part of the expansion cycle and the exhaust cycle.

The experimental evidence generated by applicant supports the basic premise necessary to improve idle that intake valve opening may be delayed much further than what might be regarded as standard practice as long as desirable exhaust valve timing events are selected. The degree to which this option may be exercised is dependent upon many engine specifics, the principal ones are intake valve size and intake port flow capacity. As to the maximum degree of EVO delay which can be tolerated, see FIG. 12 where the appearance of a downward directed pressure bluge 148 in the open valve inlet portion of the pressure-volume diagram represents a pressure decrease early in the intake cycle and signals a limit beyond which the intake valve opening should not be delayed since flow losses may be then encountered. The key to reducing valve overlap is proper selection of the EVC event and a delayed IVO. This improves low speed performance and idle economy without incurring substantial performance penalties at high speed.

The expanded pressure-volume analysis of the open valve events has also indicated that the timing of the intake valve closing (IVC) is a significant determinant of the balance between low speed and high speed volumetric efficiency. Therefore, the IVC event must be established on the basis of desired engine performance characteristic. It is common practice to change the phasing between the camshaft and crankshaft to alter the torque speed relationship at wide open throttle. However, if this is done over too wide a range the result may be an excessive power loss if phased for low speed torque and conversely an excessive loss in lower speed torque if phased for high speed power. Experimental results show that the IVC should occur somewhat in a 44–67 degree range centered on about 50 degrees after BDC. Engine dynomometer performance testing at low and high speed will establish an optimum position.

Idle quality of a vehicle engine is that property which arbitrarily and subjectively reflects noise and vibration from the engine while idling. During the recent period when 6 and 8 cylinder engines were common, the high customer idle quality customers' expectations were established. Because of the emphasis on fuel economy, 4 cylinder engines have increased in popularity while the expectations of good idle quality have not diminished. In addition, idle quality considerations often influence idle fuel consumption. Common methods to increase idle quality are: increased idle speeds, richer fuel-air mixtures and retarded spark timing. These also tend to increase idle fuel consumption.

It has been determined that high valve overlap and the resultant combustion dilution by exhaust gases plays a dominant role in poor combustion at idle. The result in that there is typically a high degree of cycle-to-cycle variability in burn rate which is reflected in torque impulse variations associated with the engine firing events. This causes the engine structure to vibrate accordingly. In FIG. 13, the upper band or trace from an accelerator reflects vibrations of a 2.2 liter Chrysler engine with a conventional camshaft as described heretofore with the 28° overlap. By decreasing the valve overlap with a delayed IVO and earlier EVC, idle tests of the same engine show that the burned gas fraction (BGF) in the combustion chamber was significantly decreased and, resultantly, there is a much greater tolerance for various factors which are detrimental to effective burn rate particularly at idle (poor mixture distribution, inadequate mixture preparation, and random fluid mechanical characteristics). The bottom trace of FIG. 13 reflects the decreased vibrations by use of a significantly lowered overlap (14°) camshaft in the 2.2 liter Chrysler engine.

It is expected that camshaft designs based on the applicant's method resulting in delayed IVO, early EVC and low overlap will enable the implementation of a greatly improved fuel idle control strategy without adverse affects on idle quality (driveability and vibration). It is expected that less rich or even net lean fuel/air mixtures may be employed while maintaining adequate idle quality. Also, it is hoped that lower idle speeds and more nearly optimum spark timing may be employed.

In summary, it is found that traditionally large valve overlaps are the consequence of too early intake valve opening and too late exhaust valve closing with no significant gain in performance. It is primarily late EVC which influences the high speed volumetric efficiency. Thus, the emphasis is to select a maximized EVC and substantially eliminate, to the degree possible, valve overlap by delaying IVO without seriously affecting the engine's potential power. The method of valve event selection is set forth in the following claims which are intended to cover embodiments described heretofore and reasonable equivalents.

I claim:

1. A method for selecting optimum engine valve timing events for an internal combustion engine to maximize idle fuel economy and smoothness without significant reduction of engine performance at rated speed and at full load, comprising the steps of:

generating data to plot an expanded open-valve portion of an engine cylinder pressure-volume diagram for a series of different camshaft configurations and phasings of valve events over the expected useful engine speed range, particularly at rated speed and full load;

selecting camshafts and valve events from the series of expanded open valve diagrams of the engine at rated speed and under full load, a desirable exhaust valve opening event which occurs before the bottom dead center piston position just sufficiently to produce an efficient early evacuation of burned combustion products from the cylinder, characterized in the expanded pressure-volume plots by a rapid decrease in cylinder pressure adjacent the bottom dead center piston position and following the expansion and thereafter a substantially constant low pressure plot during the open exhaust valve evacuation cycle portion when the piston moves towards the top dead center position;

selecting from the series of expanded open valve diagrams of the engine at rated speeds and under full load conditions a desirable exhaust valve closing event occurring adjacent to and after the top dead center piston position just sufficiently to produce a substantially complete evacuation of the burned combustion products from the cylinder, characterized in the expanded pressure-volume plots by a substantially horizontal plot representing a relatively constant pressure as the piston moves past the top dead center position, thus avoiding an undesirable rapid increase in pressure before the top dead center position is attained by the piston which increase is an unfavorable indicator of the exhaust valve closing event phased too early in the engine cycle;

selecting from the series of expanded open valve diagrams of the engine plotted under substantially idle and no load conditions, a desirable intake valve opening event, occurring before the selected exhaust valve closing event just sufficiently to produce efficient filling of the combustion chamber with a charge of fuel and air without substantial leakage of combustion products back into the cylinder characterized in the expanded pressure-volume plots by a substantially horizontal plot of constant pressure between the piston's top dead center position and the piston's bottom dead center position, thus avoiding an undesirable substantial decrease in cylinder pressure at and immediately after the top dead center position which is an unfavorable indicator of the intake valve opening event phased too late in the engine cycle.

2. A method of analysis and selection of optimum engine valve timing events for an internal combustion engine to maximize idle fuel economy and smoothness without significant reduction of engine performance at rated speed and at full load, comprising the steps of:

generating data to plot an expanded open-valve portion of an engine pressure-volume diagram for a series of different camshaft configurations and phasings of valve events over the expected useful engine speed range, especially at rated speed and full load where valve throttling is significant;

selecting from the series of expanded open valve diagrams of the engine at speed and under load conditions, a desirable exhaust valve opening event characterized in the expanded pressure-volume plots by rapid lowering of cylinder pressure adjacent to and right after the bottom dead center piston position which follows the expansion phase of engine operation thereby permitting an efficient and substantially constant pressure evacuation phase;

selecting from the series of expanded open valve diagrams of the engine at rated speed and full load conditions, an exhaust valve closing event occurring adjacent to and after the top dead center piston position which produces substantially complete evacuation of the combustion products from the cylinder, characterized by a substantially horizontal plot representing a relatively constant pressure as the piston moves past the top dead center position, thus avoiding an undesirable rapid increase in pressure which is an unfavorable indicator of an exhaust valve closing event phased too early in the engine cycle;

selecting from the series of expanded open valve diagrams of the engine plotted under substantially idle and no load conditions, a desirable intake valve opening event occurring before the selected exhaust valve closing event just sufficiently to produce efficient filling of the combustion chamber with a charge of fuel and air without substantial leakage of combustion products back into the cylinder characterized in the expanded pressure-volume plots by a substantially horizontal plot of constant pressure between the piston'stop dead center position and the piston's bottom dead center position, thus avoiding an undesirable substantial decrease in cylinder pressure at and immediately after the top dead center position which is an unfavorable indicator of the intake valve opening event phased too late in the engine cycle.

3. A method for selecting optimum engine valve timing events for an internal combustion engine to maximize idle fuel economy and smoothness without significant reduction of engine performance at rated speed and at full load, comprising the steps of:

generating data to plot an expanded open-valve portion of an engine cylinder pressure-volume diagram for a series of different camshaft configurations and phasings of valve events over the expected useful engine speed range, particularly at rated speed and full load where valve throttling is most significant;

selecting camshafts and valve events from the series of expanded open valve diagrams of the engine plotted at rated speed and under full load conditions, a desirable exhaust valve opening event occurring before the bottom dead center piston position just sufficiently to produce an efficient early evacuation of burned combustion products from the cylinder, characterized in the pressure-volume plots by a nearly vertical plot representing a rapid decrease in cylinder pressure adjacent to and after the bottom dead center piston position which represents the early portion of the evacuation part of the expanded open valve portion of the engine cycle and followed by a substantially constant and horizontal pressure plot during the mid and latter part of the evacuation cycle as the piston moves toward the top dead center position;

selecting from the series of expanded open valve diagrams of the engine at rated speed and under full load conditions, a desirable exhaust valve closing event occurring adjacent to and after the top dead center piston position to produce substantially complete evacuation of the burned combustion products from the cylinder, characterized in the expanded pressure-volume plots by a substantially horizontal plot representing a relatively constant pressure as the piston moves past the top dead center position, thus avoiding an undesirable rapid increase in pressure which is an unfavorable indicator of the exhaust valve closing event phased too early in the engine cycle;

selecting from the series of expanded open valve diagrams of the engine plotted under substantially idle and no load conditions, a desirable intake valve opening event occurring before the selected exhaust valve closing event just sufficiently to produce efficient filling of the combustion chamber with a charge of fuel and air without substantial leakage of combustion products back into the cylinder characterized in the expanded pressure-volume plots by a substantially horizontal plot of constant pressure between the piston's top dead center position and the piston's bottom dead center position, thus avoiding an undesirable substantial decrease in cylinder pressure at and immediately after the top dead center position which is an unfavorable indicator of the intake valve opening event phased too late in the engine cycle.

* * * * *